Aug. 7, 1956 J. PEYSSOU 2,758,268
ADJUSTABLE TUBULAR CONDENSER
Filed Nov. 28, 1952 2 Sheets-Sheet 1

INVENTOR.
Jean Peyssou
BY
Attorney

Aug. 7, 1956  J. PEYSSOU  2,758,268
ADJUSTABLE TUBULAR CONDENSER
Filed Nov. 28, 1952  2 Sheets-Sheet 2

INVENTOR.
Jean Peyssou
BY Paul B. Hunter
Attorney

United States Patent Office 2,758,268
Patented Aug. 7, 1956

2,758,268

ADJUSTABLE TUBULAR CONDENSER

Jean Peyssou, Paris, France, assignor to Compagnie Generale de Telegraphie Sans Fil, Paris, France Application November 28, 1952, Serial No. 323,036

4 Claims. (Cl. 317—249)

This invention relates, generally, to electrical condensers, and the invention has reference more particularly to a novel adjustable, and hence variable, tubular condenser having an interior fixed cylindrical condenser plate and an outer movable condenser plate or condenser plate portion.

Heretofore, tubular condensers have been built where the outside plate or armature is fixed upon a suitable tubular insulator, and the interior armature is made adjustable longitudinally as by use of a metal screw which is threaded into the non-conducting cylindrical dielectric. Such devices have not enjoyed extensive use because of various disadvantages including difficulties in obtaining close tolerance of the interior thread of the insulating cylinder, particularly where this cylinder is made of ceramic. The play between the inside armature or condenser plate and the outside armature or plate resulting from loose threads cause oscillations in use which are highly objectionable and results in an undesired variable output of the condenser. To obtain close tolerance, extreme accuracy of the threads is required, and this greatly enhances the cost of the condenser.

The principal object of the present invention is to provide a novel adjustable, tubular condenser which may be set to any desired capacity within a suitable range, and which will maintain this selected capacity without variance and without oscillations regardless of the use to which the same is put.

Another object of the present invention is to provide a novel adjustable, tubular condenser having a tubular insulating body as of ceramic, an inside armature or cylindrical plate fixedly attached to the interior surface of the insulating body, and an exterior armature or plate snugly embracing the insulating body and adapted to be movable in whole or in part thereover, to thereby adjust or vary the capacity of the condenser as desired.

Still another object of the present invention is to provide a novel, tubular condenser, preferably employing a ceramic tubular body, having an interior conducting coating serving as an inner condenser plate, and an outer longitudinally split metallic, tubular member or plate adapted to be adjusted longitudinally on the tubular insulating body, to thereby adjust or vary the capacity of the condenser as desired.

Another object of the invention is to provide a novel, tubular condenser wherein the exterior, cylindrical plate or armature is in two parts, one such part being fixed to the insulating body and the other being movable thereover to vary the capacity of the condenser.

Other objects and advantages will appear as the description proceeds.

Referring now to the drawings:

Figs. 6a, 6b, 6c, 6d and 6e illustrate various ways in which the inner condenser plate is provided with a terminal connection.

Figs. 7a, 7b, 7c, 7e and 7d illustrate various ways in which the outer condenser plate is provided with a terminal connection.

In the following description, similar parts are similarly numbered in the several figures of the drawings.

Figure 1:
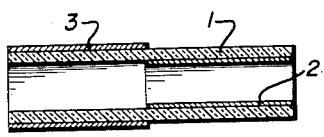
Fig. 1 is a sectional view illustrating one form of the invention.

Referring specifically to Fig. 1, there is shown a hollow, tubular cylinder 1 of non-conducting material, such as ceramic, having an inner condenser plate or armature 2, also of cylindrical shape, fixed to the inner surface of the insulating cylinder 1 and extending from an end thereof partially along the length of such insulating cylinder. The inner plate 2 may be in the form of a metallic coating, as of silver, if desired, adhered to the inner surface of the dielectric cylinder. The outer armature or condenser plate 3 is of cylindrical shape, and is slidable over the exterior surface of the insulating cylinder or dielectric 1. It will be noted that the length of the plate 3 together with that of the plate 2 substantially equals the over-all length of the dielectric cylinder 1. With the plates 2 and 3 positioned as shown in Fig. 1, minimum capacity is provided therebetween, and, as the plate 3 is moved towards the right in Fig. 1 to progressively overlie a larger portion of the plate 2, the capacity of the condenser is increased. Thus, the plate 3 may be set so that this capacity will have any desired value, and hence the output of the condenser will vary accordingly.

Figure 2A:
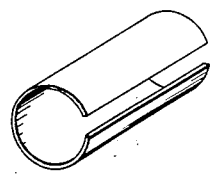
Figs. 2a, 2b, 2c, 2d, 2e and 2f show various constructions of the exterior, movable condenser plate or armature, adapted to be used in the structure of Fig. 1, for example.

Preferably, the outer armature 3 consists of a split metallic cylinder such as shown in Fig. 2a, the longitudinal split in the cylinder allowing the same to firmly embrace and remain in any desired position upon the exterior surface of the dielectric cyliner 1. The plate 3, as shown in Fig. 2a, is sufficiently elastic so as to firmly grip the dielectric body 1 while at the same time permitting this plate 3 to be longitudinally adjustable. Owing to this novel construction, the mechanical and electrical stability of the resulting condenser is exceedingly high, while at the same time such a condenser can be produced at a nominal price and without requiring close tolerances.

Figure 2B:
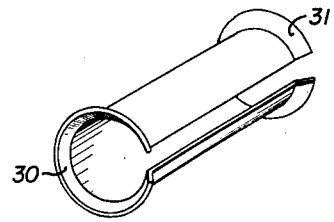

In the construction shown in Fig. 2b, the outer condenser plate 3 is provided with end flanges or collars 30 and 31 to increase the stiffness and hence gripping action of the plate while at the same time providing a suitable terminal connection for this outer plate.

Figure 2C:
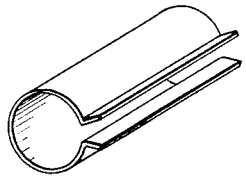

Fig. 2c shows the outer condenser plate formed with outwardly projecting lips adjoining the split for facilitating easy gripping of the same when it is desired to move this plate over the insulating body 1.

Figure 2D:
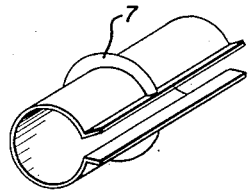

In Fig. 2d, a metal spring collar or ring 7 is employed to enhance the gripping effect of the external condenser plate upon the dielectric body 1, to firmly hold such plate in adjusted position.

Figure 2E:
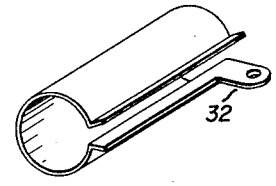
Figure 2F:
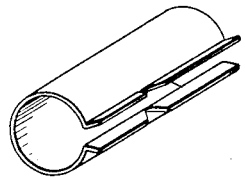

In Fig. 2e, one lip of the outer conductor plate is shown provided with a projecting tab 32 for easy connection to an external circuit.

Figure 3A:
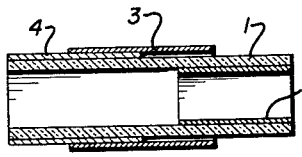
Figs. 3a and 3b are sectional views showing structures employing an outer, cylindrical armature or plate made in two parts, one being fixed and the other movable or slidable thereover.
Figure 3B:
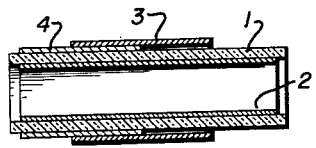

Instead of having the external condenser plate 3 entirely movable as in the previously described figures, this plate may be made in two portions as shown in Figs. 3a and 3b, i. e., a fixed portion 4 and a movable or slidable portion 3. The portion 4 can be formed as by electrical plating upon the exterior surface of the ceramic or insulating body 1, while the mobile or slidable portion 3 can be formed as disclosed in the previous figures and is slidable over the fixed portion 4 to thereby vary the capacity with respect to the inner plate 2 shown extending partway along the length of the dielectric body 1 in Fig. 3a and shown in Fig. 3b as extending for the greater part of the length of this dielectric body. The part 4 also serves as a terminal connector for the exterior plate, if desired. Also, this part can be used as a mounting for engaging such a suitable terminal connection. Owing to the snug grip of the part 3 upon the part 4, these members are in good electrical contact at all times. Also, owing to suitable variations in the relative lengths of the inner plate 2 and the outer adjustable plate 3, any desired capacity can be obtained owing to the fact that this latter plate is movable.

Figure 4:
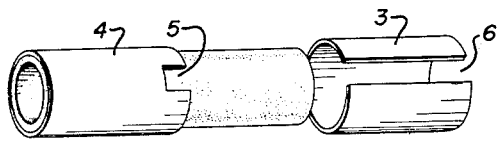
Fig. 4 is a perspective view of another form of condenser having fixed and movable exterior plate portions.

If desired, as shown in Fig. 4, the fixed part 4 of the exterior armature or condenser plate may have an irregularly shaped end or embrasure 5 for cooperating with the split movable plate 3. If desired, the split 6 may correspond in width to that of the recess or embrasure 5, to thereby obtain a minute capacity adjustment by turning and sliding the part 3 over the fixed part 4.

Figure 5A:
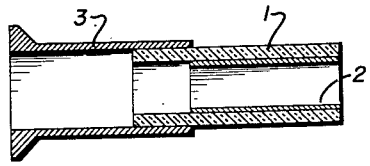
Figs. 5a and 5b are sectional views of modifications.
Figure 5B:
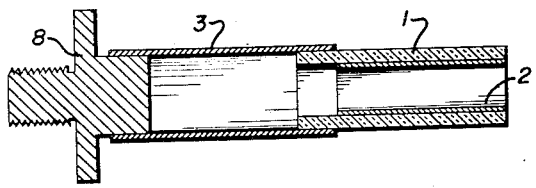

Various types of connections can be used for connecting the exterior plates 3 to external circuits. Thus, in Figs. 5a and 5b, two examples are given. In Fig. 5a, the plate 3 is formed with an enlarged end portion to facilitate connection as by welding directly to a chassis, whereas in Fig. 5b the external plate 3 is soldered or otherwise adhered to a threaded base 8 which may be screwed into an aperture in the chassis or other appropriate support.

Figures 6A, 6B, 6C:
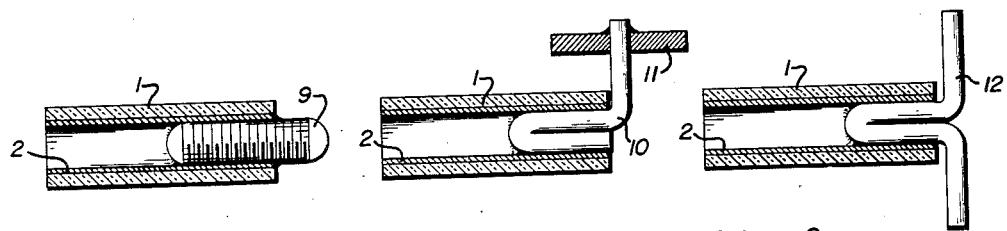
Figures 6D, 6E, 7A:
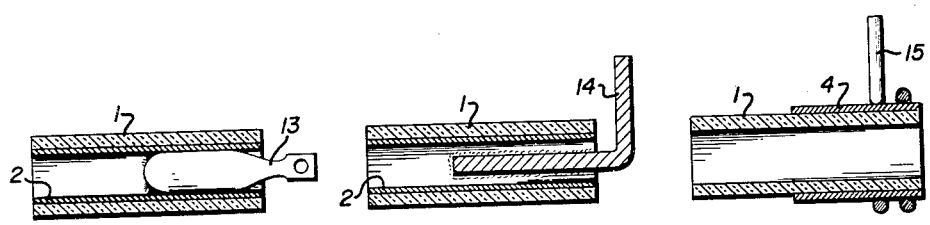
Figures 7B, 7D, 7E:
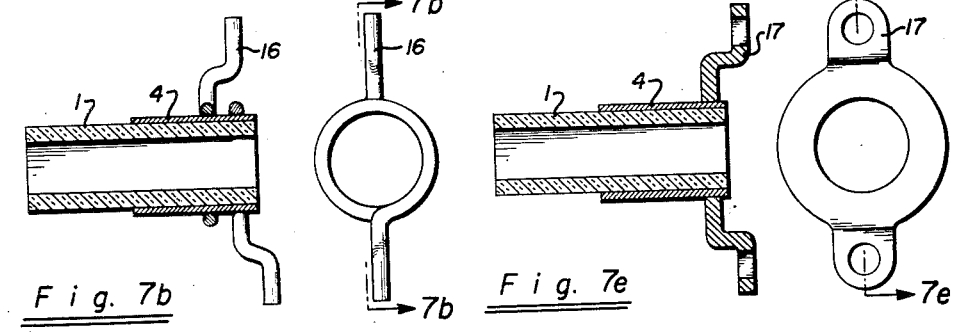

There are various ways in which the inner armature may be connected to external circuits, examples of which are shown in Figs. 6a to 6e. Thus, in Fig. 6a, a threaded shaft 9 extends into the interior of the inner plate 2, and may be secured thereto as by soldering. In Fig. 6b, a wire 10 as of copper is soldered to the plate 2 and is shown supported from a shell 11 as by soldering through an aperture therein. If desired, the wire may be bent with a U-shaped portion as shown at 12 in Fig. 6c, for soldering or welding to the inner, cylindrical plate 2. In Fig. 6d, a shell 13 is soldered to the inner conductor and serves as a terminal connection, while in Fig. 6e a right-angled member 14 may be soldered or otherwise secured within the inner plate 2.

Where the installation requirements permit welding to the fixed part of the exterior armature or plate, it is possible to mount a wire connection either wound in a regular manner as shown in Fig. 7a or fashioned in the form of a support or frame with two branches such as shown in Figs. 7b and 7c; these wound connections being welded or soldered on to the armature or exterior plate 4. If desired, a stamped or pressed metal part such as shown at 17 in Figs. 7d and 7e may be welded or soldered to the exterior condenser plate 4, thus providing a terminal connection.

Figure 8:
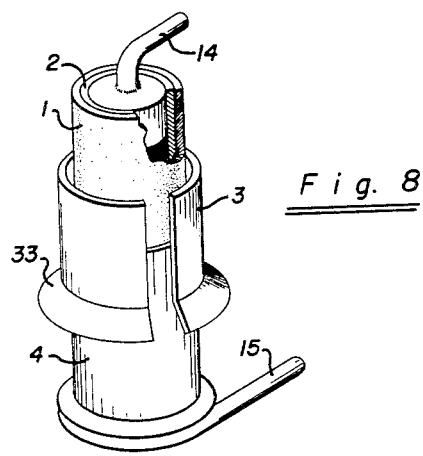
Fig. 8 is a perspective assembly view showing a complete condenser constituting a preferred embodiment of the invention.

Fig. 8 shows a complete condenser employing the principles of the present invention and consisting of a hollow, cylindrical tube 1 of ceramic or other dielectric, an interior condenser plate 2 which may take the form of a deposited conducting film, an exterior condenser plate or deposited film portion 4 of a desired length fixed to the exterior surface of the insulating body 1 and extending along a portion of the length thereof removed from the interior condenser plate 2 together with a slidable and turnable, split, mobile or exterior condenser plate portion 3 for varying the capacity of the condenser. This plate 3 is shown as in Fig. 2b with a collar 33 for stiffening the same and enhancing the grip of the plate 3 upon the fixed plate 4. Also, the flange 33 enables the easy gripping of the member 3 for sliding the same along the fixed part 4. Wire connections 14 and 15 are shown serving as external connections; wire 14 being shown soldered to an end cap member which in turn is secured to the inner plate 2, whereas the wire 15 is secured to the fixed external plate portion 4 in the manner shown in Fig. 7a.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An adjustable tubular condenser comprising a hollow cylindrical insulating member, an inner metallic armature adhered to the inner surface of said member, and a metallic outer armature having a first portion surrounding and fixedly adhered to the outer surface of said member, and a second portion consisting of a split elastic tubular metallic member slidable over the fixed portion, said fixed portion being provided with an irregular contour comprising a longitudinal embrasure whose width corresponds to that of the split of the movable portion, whereby a minute capacity adjustment may be obtained by turning and sliding the movable portion over the fixed portion.

2. A condenser as defined in claim 1, wherein said first fixed portion serves as a mounting in which a terminal connection is engaged.

3. A condenser as defined in claim 1, wherein said first fixed portion is constituted by a metallic coating on the external surface of the insulating member.

4. A condenser as defined in claim 1, in which at least a part of said fixed portion of the external metallic armature is opposite to the internal armature.

References Cited in the file of this patent

UNITED STATES PATENTS

| | | |
|---|---|---|
| 1,441,212 | Cardwell | Jan. 9, 1923 |
| 1,937,874 | Debrunner | Dec. 5, 1933 |
| 2,516,981 | Hall et al. | Aug. 1, 1950 |
| 2,544,550 | Bird | Mar. 6, 1951 |
| 2,607,826 | Barnes | Aug. 19, 1952 |

FOREIGN PATENTS

| | | |
|---|---|---|
| 440,950 | Great Britain | Jan. 6, 1936 |
| 633,843 | Great Britain | Dec. 30, 1949 |
| 608,084 | Germany | Jan. 15, 1935 |
| 668,730 | Germany | Dec. 12, 1938 |
| 899,778 | France | Sept. 4, 1944 |